(12) United States Patent
Kumar et al.

(10) Patent No.: US 7,490,142 B2
(45) Date of Patent: Feb. 10, 2009

(54) AUTOMATIC CLIENT MANAGEMENT AUTHORITY ASSIGNMENT

(75) Inventors: Deepak Kumar, Kirkland, WA (US); Kenneth Mark Osborne, Sammamish, WA (US); Daniel N. J. Drew, Bothell, WA (US); David C. James, Bothell, WA (US); Michael J. Healy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 10/423,079

(22) Filed: Apr. 25, 2003

(65) Prior Publication Data

US 2004/0215751 A1 Oct. 28, 2004

(51) Int. Cl.
  *G06F 15/177* (2006.01)
  *G06F 9/00* (2006.01)

(52) U.S. Cl. .................. 709/222; 709/203; 709/217; 713/1; 713/2

(58) Field of Classification Search ............... 712/205; 455/432.2, 423.3; 463/42, 43; 713/1, 2, 713/100, 153, 155, 156, 189, 191; 370/357, 370/360, 375, 377, 351; 707/1, 2, 3, 4, 5, 707/6, 7, 8, 9; 718/100, 101, 102, 104; 726/1, 726/2, 17, 18; 710/8, 9, 10; 717/103, 120, 717/121, 168, 169, 170, 171, 172, 174, 175, 717/176, 177, 178; 715/740, 741
See application file for complete search history.

(56) References Cited

U.S. PATENT DOCUMENTS

| | | | |
|---|---|---|---|
| 5,349,643 A * | 9/1994 | Cox et al. | 713/155 |
| 6,886,017 B1 * | 4/2005 | Jackson et al. | 707/104.1 |
| 2003/0097553 A1 * | 5/2003 | Frye, Jr. | 713/2 |

* cited by examiner

*Primary Examiner*—Ashok B Patel
(74) *Attorney, Agent, or Firm*—Lee & Hayes, PLLC

(57) ABSTRACT

Systems and methods for automatic client management authority assignment are described. In one aspect, it is determined that a network management point has not been configured for a client. Responsive to this, a directory service is requested to automatically assign a site code to the client. The automatically assigned site code identifies the management point through which the client can obtain management service(s).

24 Claims, 2 Drawing Sheets

AUTOMATIC CLIENT MANAGEMENT AUTHORITY ASSIGNMENT

RELATED APPLICATIONS

This application is related to U.S. patent application Ser. No. 10/403,699, now U.S. Pat. No. 7,260,602, titled "SYSTEM AND METHOD OF NETWORK CONTENT LOCATION FOR ROAMING CLIENTS", filed on May 31, 2003, commonly assigned hereto, and hereby incorporated by reference.

TECHNICAL FIELD

The invention pertains to network management.

BACKGROUND

A common problem for centrally managing a large number of computing devices in an enterprise network revolves around identifying and assigning an appropriate network management server to perform management tasks for each managed computing device in the enterprise. Such management tasks include, for example, delivery of policy (e.g., software provisioning instructions to obtain software package(s), software package installation scripts, configuration data, and/or the like, from one or more software distribution servers, etc.) to enterprise computing devices. Unfortunately, there is no automated technique to identify and assign network management servers to enterprise computing devices. Instead, network administrator(s) have to manually identify and assign network management server(s) to each computing device in the enterprise that is to be managed.

For instance, network administrators are typically required to physically access control panel user interface(s) presented by each computing device to be managed to assign a particular "site code" to the computing device. The term "site", or "site code" refers to the local area network (LAN), or the LAN sub-network in an enterprise to which at least one network management server is associated, and which acts as a management point for at lease one computing device. Only after the computing device has been manually assigned a site code by an administrator, can the computing device be booted into the enterprise for management by a network management server associated with the pre-configured site code. The need to repetitively perform such manual identification and assignment operations can be substantially time consuming, labor intensive, error prone, and expensive. This is especially the case when an enterprise includes many computing devices (e.g., hundreds of thousands) that need to be managed and many network management servers (e.g., hundreds).

SUMMARY

Systems and methods for automatic client management authority assignment are described. In one aspect, it is determined that a network management point has not been configured for a client. Responsive to this, a directory service is requested to automatically assign a site code to the client. The automatically assigned site code identifies the management point through which the client can obtain management service(s).

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

Exemplary Operating Environment

Figure 1:
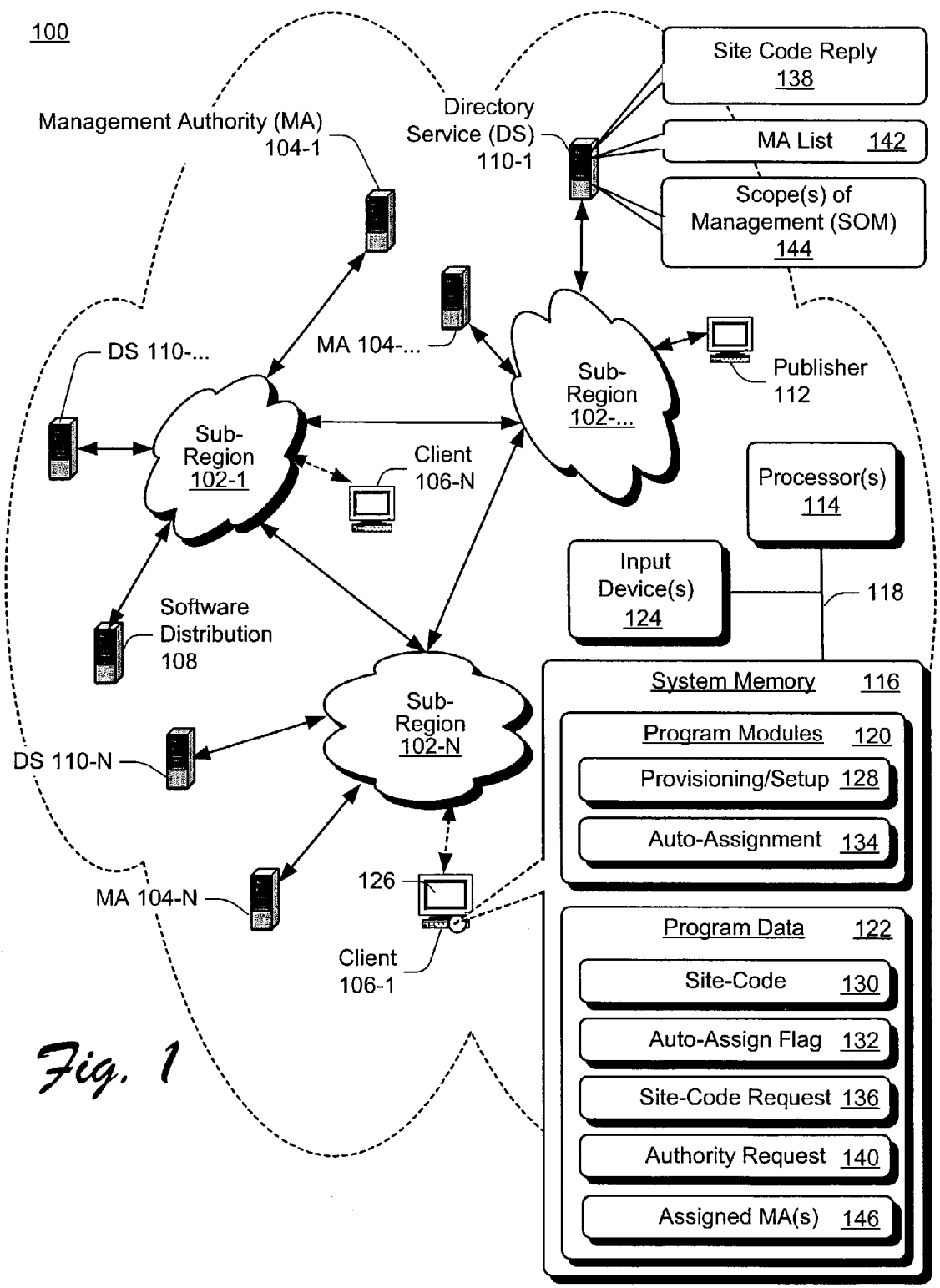
FIG. 1 shows an exemplary computing environment within which systems and methods for automatic client management authority assignment may be implemented.

Turning to the drawings, wherein like reference numerals refer to like elements, the invention is illustrated as being implemented in a suitable computing environment. Although not required, various embodiments of the invention are described in the general context of computer-executable instructions, such as program modules, being executed by one or more computing devices. Program modules generally include routines, programs, objects, components, data structures, etc., that perform particular tasks or implement particular abstract data types.

FIG. 1 illustrates an example of a suitable computing environment 100 on which the subsequently described systems, apparatuses and methods for automatic client management authority server assignment may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

Exemplary computing environment 100 is a network that is hereinafter often referred to as "network 100". Network 100 includes, for example, one or more sub-regions 102 (e.g., 102-1 through 102-N). In one implementation, each sub-region 102 is a local area network (LAN) that is connected by wide area networks (WANs). In another implementation, the network 100 is a WAN, and the sub-regions 102 are each WAN sub-regions coupled to one another by respective switching device(s) (not shown).

The exemplary computing environment 100 includes at least one of each of the following components coupled to respective ones of the sub-regions 102: management authority server(s) 104 (e.g., 104-1 through 104-N), client(s) 106 (e.g., 106-1 though 106-N), software distribution service server(s) 108, directory service server(s) 110 (e.g., 110-1 through 110-N), and publisher(s) 112. Examples of well known computing systems, environments, and/or configurations that may be suitable for modification to achieve functionality of components 104-112 include, but are not limited to, personal computers, server computers, multiprocessor systems, microprocessor-based systems, network PCs, minicomputers, mainframe computers, distributed computing environments that include any of the above systems or devices, and so on. Compact or subset versions of the client 106 portion of the framework for automatic client management authority assignment may also be implemented in computing devices of limited resources, such as cellular phones, personal digital assistants, handheld computers, or other communication/computing devices.

Each component 104-112 includes a respective network address (not shown). In this implementation, network addresses are configured so that a common sub-network address indicates a location on the same LAN, or on the same LAN sub-network. Network addresses may be further configured so that an address within a certain range indicates a location on the same sub-region 102 (e.g., LAN, or on the same LAN sub-network). A sub-network address corresponding to any particular component 104-112, may be derived by performing a binary AND operation on a network address and an appropriate network or sub-network mask. Although, a particular client 106 can be moved from one sub-region 102 to another, the particular client 106 can only be coupled to one of the one or more sub-regions 102 at any given time. (A dashed line connecting a client 106 to a particular sub-region 102 indicates that the client 106 can be moved).

Each management authority server 104, client 106, software distribution services server 108, directory service 110, and publisher 112 includes a processor coupled to a system memory for storing at least one computer-program ("program module") and respective program data; the processor for executing the at least one program module, accessing and/or generating the program data. In executing the program module and accessing/generating the program data, each respective processor of the computing components 102 through 112, causes the management authority server 104, client 106, software distribution services server 108, directory service 110, and publisher 112 to automatically detect and assign a management authority server 104 to at least one client 106 as a function of several criteria. Such criteria include, for example, indications of whether a client 106 that is booting into the network 100 is in an "un-configured state" (i.e., has not been assigned a management point 104), whether the client 106 is configured for automatic management point assignment, and the particular one subnet 102-1 through 102-N into which the client 106 is booting.

Illustrative of such processor and system memory configurations are the exemplary features of client 106-1. Such features include, but are not limited to, one or more processors or processing units 114, a system memory 116, and a bus 118 that couples various system components including system memory 116 to processor 114. The system bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

System memory 116 of client 106-1 includes computer readable media in the form of volatile memory, such as random access memory (RAM), and/or non-volatile memory, such as read only memory (ROM). RAM typically contains program modules and/or data that are immediately accessible to and/or presently being operated on by processor(s). For example, system memory 116 of the client 106-1 includes program modules 120 and program data 122 that are immediately accessible and/or presently being operated on by processors 114.

Components 104-112 may further include other removable/non-removable, volatile/non-volatile computer storage media (not shown) such as a hard disk drive for reading from and writing to a non-removable, non-volatile magnetic media (not shown and typically called a "hard drive"), a magnetic disk drive for reading from and writing to a removable, non-volatile magnetic disk (e.g., a "floppy disk"), and an optical disk drive for reading from or writing to a removable, non-volatile optical disk such as a CD-ROM/R/RW, DVD-ROM/R/RW/+R/RAM or other optical media.

The drives and associated computer-readable media provide nonvolatile storage of computer readable instructions, data structures, program modules, and other data for components 104-112. It should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A user may provide commands and information into respective ones of components 104-112 through input devices such as keyboard and pointing device (such as a "mouse"). For example, the computing device 106-1 includes input device(s) 124 connected to processor(s) 114 through a user input interface (not shown) coupled to bus 118, but may be connected by other interface and bus structures, such as a parallel port, game port, or a universal serial bus (USB). Other input devices (not shown) may include a microphone, joystick, game pad, satellite dish, serial port, scanner, camera, etc.

A respective monitor or other type of display device may also connect to various ones of components 104-112. For example, monitor 126 of the client 106-1 is connected to the bus 118 via an interface (not shown) such as a video adapter.

Each management authority (MA) server 104 (e.g., respective ones of the MA servers 104-1 through 104-N) provides one or more assigned clients 106 with administrative services such as the delivery of policy instructions to the clients 106. Such policy identifies, for example, software provisioning instructions to obtain software package(s), software package installation scripts, configuration data, and/or the like. In one implementation, a MA 104 implements System Management Server (SMS) services, a product of Microsoft Corporation of Redmond, Wash., from one or more software distribution servers 108.

A MA 104 is configured to communicate with a client 106, such as by means of HTTP messages and commands. As described below, at least a subset of the client's 106 coupled to the network 100 are automatically assigned to a specific network MA 104. Conversely a MA 104 is assigned to at least one client 106. A MA 104 provides administrative services to its assigned clients 106, as well as administrative services for specific software distribution servers 108. As such, a network management server 104 is commonly termed a "network management server," an "administrative server," a "management point," and/or the like.

Before a client 106 can be managed by a MA 104, the client must be configured for such management. As discussed above, conventional techniques require a network administrator to manually assign a specific network management server to a client, for example, by manually assigning a site code to the client. In contrast to such conventional techniques, client(s) 106 can be automatically configured, upon installation into the network 100, for management by a MA server 104. For purposes of discussion, exemplary operations to automatically identify and configure a client 106 (one of the clients 106-1 through 106-N) for management by a MA 104 are discussed in reference to the program modules 120 and program data 122 of the client 106-1.

A client 106 includes a provisioning/setup module 128 to allow a user (e.g., a computer administrator) to configure the client 106 to automatically locate and assign a MA 104 to the client 106 when the client is introduced (e.g., booted, brought online, powering-up, and/or the like) to the network 100.

(Techniques for determining that a computing device is being introduced into a network are known). To this end, the provisioning/setup module 128 allows the user to set the site code 130 to null and set the auto-assign flag 132 to a non-zero value. A null site code 130 indicates that the client device 108 has not been assigned a MA 104. A non-zero auto-assign flag 132 indicates that the site code 132, and thus an MA 104, is to be automatically identified by the auto-assignment module 134 and assigned to the client device 108. At this point, the computing device 106 is subsequently powered down by the user, for example, for shipping to a customer and subsequent introduction to the network 100.

Responsive to being introduced to the network 100, the auto-assignment module 134 of the client 106 checks to see if the client 106 is already configured with a site code 130 (e.g., a local management point such as a SMS site published by the directory service server(s) 110 for the current sub-region 102). If the site code 130 is non-zero, the auto-assign module 134 determines that the client 106 has already been configured to utilize at least one MA 104 associated with the sub-region 102 into which it has connected. Otherwise, if the site code 130 is null (zero), the auto-assignment module 134 evaluates the auto-assign flag 132 to determine whether auto-assignment has been enabled on the client 106. Enabled auto assignment (e.g., a non-zero value stored in the auto-assign flag 132) indicates the client 106 is to be automatically (dynamically) assigned to a specific network management point, or site code 130 managed my at least one MA 104.

The auto-assignment module 134, responsive to determining that the client 106-1 is to be automatically assigned to a management point from which to obtain management instructions and services, queries the directory service 110 for a site code 130. In one implementation, the auto-assignment module 134 accomplishes this by communicating a site code request message 136 to a particular one directory service server 110 (e.g., one of the directory service servers 110-1 through 110-N); the particular one directory service server 110 being identified via known local point directory service discovery techniques.

In one implementation, directory service server(s) 110 allow an organization to centrally manage and share network 100 information (e.g., network resources) via local management point discovery (LMPD) services. Illustrative directory services include, for example, Active Directory®, eDirectory™, and/or the like. Such lookup service(s) may be based, for example, on a Lightweight Directory Access Protocol (LDAP). LDAP provides protocols for accessing information directories, and is based on the standards contained within the known X.500 standard. Other directory services may be based on an Internet Naming Service (INS) such as the WINDOWS® INS (WINS) service.

In this implementation, the network 100 includes at least one directory service server 110-1 through 110-N to map management points 104 to respective clients 106 for the entire enterprise 100. Thus, a particular sub-region 102 may or may not include a respective directory service server 110 (i.e., a respective one of the directory server(s) 110-1 through 110-N).

Responsive to receiving the site-code request message 136, the directory service 110, communicates a site code reply message 138 identifying an automatically determined site code 130 (e.g., the management point corresponding to the sub-region 102 into which the requesting client 106 has connected).

In this implementation, the site code 130 (management point) and auto-assign flag 132 are persistent. This means that even when a client 106 with a configured management point is powered down, moved from a particular sub-region 102 to a different sub-region 102, and/or the like, and subsequently powered on, the client's respective site code 130 and auto-assign flag 132 data values are maintained unless they are explicitly changed, for instance by the auto-assignment module 134 or manually changed (e.g., cleared) by a network administrator. For example, a site code 130 may be changed by the auto-assignment module 134 when a client 106 in an auto-assignment state becomes assigned, whereupon the site code 130 is recorded and the auto-assignment flag 132 cleared. A user/admin may manually change the auto-assign flag 132 through a control panel or automatically via a script (e.g., to migrate a number of clients 106 from one site 102 to another).

Accordingly, a client 106 that has already been assigned a non-zero site code 130 will continually use that site code 130 even if the client 106 is moved from one sub-region 102 to another. In light of this, if a network manager clears the site code 130 and sets the auto-assign flag 132, the client 106, after being powered on in the network 100, will automatically be re-assigned another site code 130 via the auto-assignment module 134. Whereas, if a network manager clears the site code 130 (the client now being in an un-configured state) and does not set the auto-assign flag 132, the client 106 (after being powered on in the network 100) will not be re-assigned a site code 130 since the auto-assign flag 132 is not set. In this last scenario, the client 106 may remain idle or perform some other action since it has not been configured to automatically locate a local management point in the network 100.

In the scenario wherein the client 106 has been automatically assigned a site code 132, the client 106 next identifies the MA(s) 104 assigned to the site code 132 the auto-assignment module 134 communicates an authority request message 140 to the directory service 110 to identify at least one MA 104 that has been designated to provide management information/services to client(s) 106 configured with the particular site code 130. Responsive to receiving the authority request 140, the directory service 110 sends management authority (MA) list 142 to the requesting client 106 to identify the one or more specific MAs 104 from which the client 106 is to obtain management services.

In this implementation, the directory service 110 generates the MA list 142 from scope(s) of management (SOM) data 144. SOM data 144 maps each MA 104 associated with the management point identified by the site code 132 to client selection criteria. Such criteria utilizes sub-network address(es), range(s) of network addresses, site name(s) (e.g., an Active Directory site name, etc.), and/or the like to determine whether a particular MA 104 is to provide management services to a particular client 106. For instance, each client 106 configured with a sub-network address that matches an MA's management range of sub-network addresses may be designated by the SOM data 144 for management by a particular MA 104. Each client 102 with a network address that falls within a predetermined range of IP addresses may be designed for management by a corresponding MA 104. Additionally, each client 102 that has a site-name in common or otherwise associated with the MA 104 can be designated by the SOM data 144 for management by an MA 104. It can be appreciated that clients 106 can be mapped to a MA 104 based on any number of criteria, including single and/or multiple combinations of criteria. In this manner, the directory service 110 maps the site code 132 to one or more MAs 104.

In one implementation, the SOM data 144 is communicated to the directory service 110 via publisher computing device 112.

In another implementation, a client computer 106 utilizes an INS (e.g., WINS) to determine an IP address associated with a particular directory server computer 110 that acts as a Service Location Point (SLP) to provide a site code 130 to the client 106, which will thereinafter direct the client 106 to one or more corresponding management points 104 as described above. In another implementation, the site code 130 for a management point 104 is a name registered via an INS.

At this point, the directory service server 110 (e.g., directory service server 110-1) communicates MA list 142 to the requesting client 106. The MA list 142 includes, for example, information (e.g., IP address(es), security data, etc.) that the client 106 can use to communicate with at least one designated MA server 104. Responsive to receiving the MA list 142, the auto-assignment module 134 assigns the client 106 to at least one of the MA(s) 104 identified in MA list 142. The assigned MA 104 is represented via the assigned MA(s) 146 portion of the program data 122. Subsequently, the client 106 continues booting into the network 100 by requesting management services from the assigned MA(s) 146.

In view of the above, a framework provided by interaction of a client 106 with a directory service 110 and a MA 104 has been described. This framework automatically assigns the MA 104 to a client 106 (i.e., as indicated by the assigned MA(s) 146). The assigned MA(s) 146 is/are "sticky" with respect to the client 106. This means that even if the client 106 is moved to different sub-regions 102 of the network 100, the automatically assigned management point(s), which were identified as a function of the site code 130, the auto-assign flag 132, and the sub-region 102 wherein the management point(s) was/were assigned, does/do not change unless the site code 130 and the auto-assign flag 132 has been explicitly cleared or set, for example, by a network administrator.

Exemplary Procedure

Figure 2:
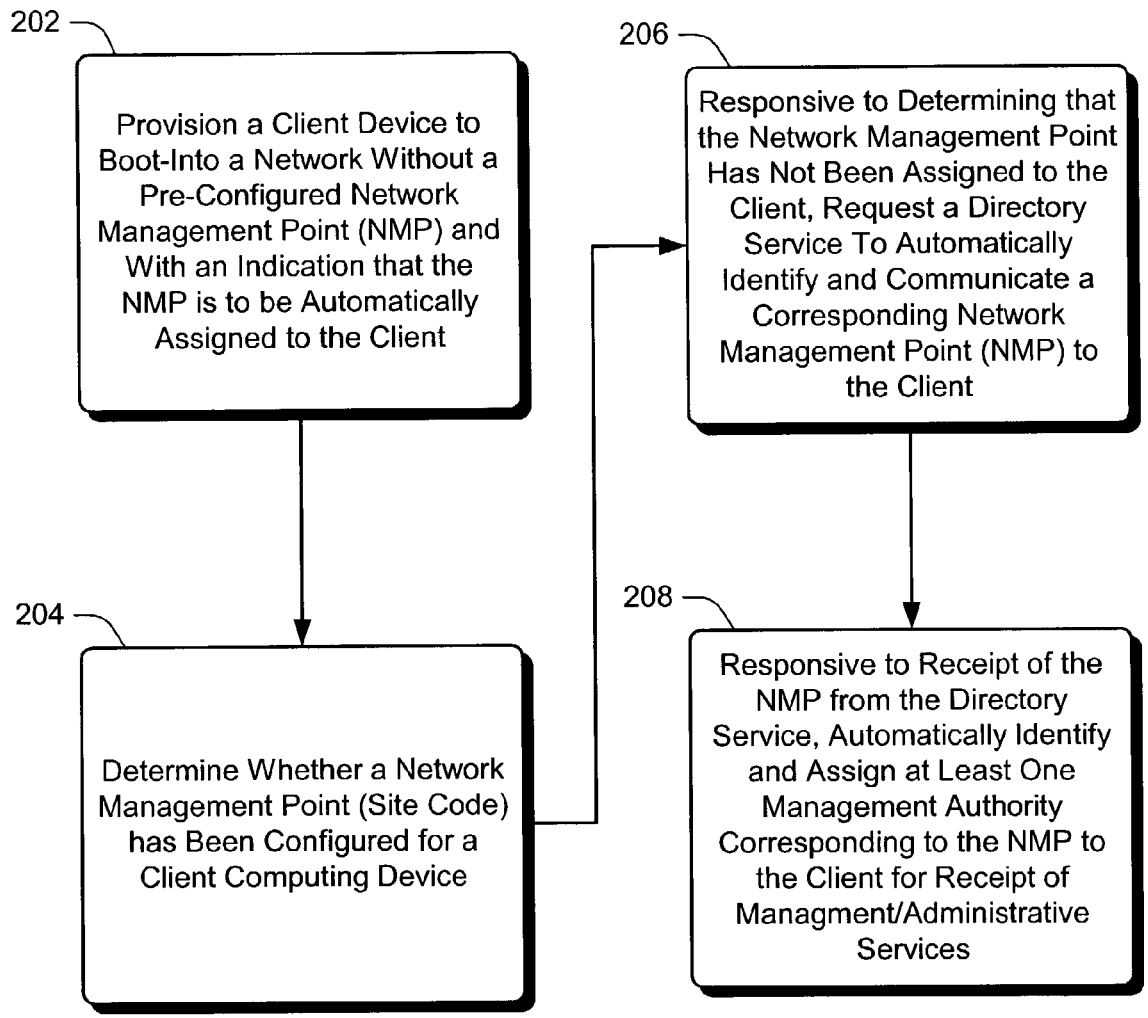
FIG. 2 shows an exemplary procedure for automatic client management authority assignment.

FIG. 2 shows an exemplary procedure for automatic client management authority assignment. For purposes of discussion, the operations of FIG. 2 are discussed in reference to features of FIG. 1. At block 202, the provisioning/setup module 128 (FIG. 1) is utilized to provision a client 106 (FIG. 1); the client subsequently to be introduced (e.g., boot-into) the network 100 (FIG. 1) without a pre-configured network management point (NMP, site code 130 of FIG. 1), and with an indication (i.e., the auto-assign flag 132 of FIG. 1) that the NMP is to be automatically identified and assigned to the client 106. At block 204, the auto-assignment module 134 (FIG. 1), responsive to detecting the client 106 is being introduced into the network 100, determines whether a NMP is already configured for the client 106.

At block 206, responsive to determining a NMP has not already been assigned to the client, the auto-assignment module 134 automatically requests a directory service 110 (FIG. 1) to identify and communicate at least one NMP (i.e., a site code 130) to the client. At block 208 and responsive to receiving the NMP/site code 130, the client 106 automatically requests (via an authority request 140 of FIG. 1) a directory service 110 to identify each management authority 104 (FIG. 1) corresponding to the site code 130. At this point, the directory service 110 communicates a management authority list 138 (FIG. 1) to the client 106. The client device 106 selects at least one MA 104 indicated in the MA list 104 for use by the client 106 for subsequent management/administrative services.

CONCLUSION

The described systems and methods provide for automatic client management authority assignment. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A method implemented by a computing device for automatic management authority server assignment, the method comprising:
    determining, by a client computing device ("client"), that a site code for receiving policy associated with an enterprise network has not been configured for the client;
    responsive to the determining, requesting, by the client, a directory service to automatically assign a site code to the client, the directory service defining a namespace for the enterprise network, the site code identifying a sub-region of the enterprise network and identifying a management authority server through which the client can obtain one or more management service(s), the client being connected to the sub-region of the enterprise network;
    responsive to the requesting, the client receiving the site code from the directory service, wherein the site code is automatically determined as a function of the sub-region of the enterprise network into which the client has been introduced in an un-configured state;
    communicating, by the client, a request to the management authority server associated with the site code to provide the management service(s) including a policy to the client; and
    responsive to the communicating, receiving the policy.

2. The method of claim 1, wherein the site code is sticky.

3. The method of claim 1, wherein the enterprise network comprises multiple sub-regions, and wherein the determining and requesting operations are performed responsive to introducing the client to a sub-region of the multiple sub-regions.

4. The method of claim 1, wherein the method further comprises:
    provisioning the client such that the management authority server is not assigned to the device; and
    setting the client to request automatic assignment of the management authority server.

5. The method of claim 1, wherein the method further comprises:
    detecting that the client is being introduced to the enterprise network;
    responsive to the detecting, evaluating a persistent flag maintained by the client to identify whether the client should request a directory service to automatically assign a site code to the client;
    responsive to an indication that the persistent flag is enabled, performing operations to request the site code; and
    responsive to an indication that the persistent flag is disabled, not requesting the site code.

6. A computer-readable medium comprising computer program instructions embedded thereon, the computer program instructions being executable by a processor for automatic management authority server assignment, the computer program instructions comprising instructions for:
    determining that a site code for receiving management services including a policy associated with an enterprise network has not been configured for a client;
    responsive to the determining, requesting a directory service to automatically assign a site code to the client, the site code identifying a sub-region of the enterprise network and a management authority server through which the client can obtain management service(s), the client being connected to the sub-region of the network, wherein the site code is automatically determined as a function of the sub-region of the network into which the client has been introduced in an un-configured state;

responsive to the requesting, receiving the site code from the directory service;

communicating a request to the management authority server associated with the site code to provide a management service to the client; and responsive to the communicating, receiving the management service including the policy.

7. The computer-readable medium of claim 6, wherein the site code is sticky.

8. The computer-readable medium of claim 6, wherein the network comprises multiple sub-regions, and wherein the instructions for determining and requesting are performed responsive to introducing the client to a sub-region of the multiple sub-regions.

9. The computer-readable medium of claim 6, wherein the computer program instructions further comprise instructions for:
provisioning the client such that the site code is not configured; and
setting the client to request automatic assignment of the site code.

10. The computer-readable medium of claim 6, wherein the computer program instructions further comprise instructions for:
detecting that the client is being introduced to the network;
responsive to the detecting, evaluating a persistent flag to identify whether the client should perform the operations of determining and requesting;
responsive to an indication that the persistent flag is enabled, performing the operations of determining and requesting; and
responsive to an indication that the persistent flag is disabled, not performing the operations of determining and requesting.

11. A computing device for automatic management authority server assignment, the computing device comprising:
a processor; and
a memory coupled to the processor, the memory comprising computer program instructions executable by the processor, the computer program instructions comprising instructions for:
determining that a site code for receiving management service(s) including a policy associated with an enterprise network has not been configured for a client;
responsive to the determining, requesting a directory service to automatically assign a site code to the client, the site code identifying a sub-region of a network and a management authority server through which the client can obtain management service(s), the client being connected to the sub-region of the network, wherein the site code is automatically determined as a function of the sub-region of the network into which the client has been introduced in an un-configured state;
receiving the site code from the directory service;
communicating a request to the management authority server associated with the site code to provide a management service to the client; and
responsive to the communicating, receiving the management service including the policy.

12. The computing device of claim 11, wherein the site code is sticky.

13. The computing device of claim 11, wherein the network comprises multiple sub-regions, and wherein the instructions for determining and requesting are performed responsive to introducing the client to a sub-region of the multiple sub-regions.

14. The computing device of claim 11, wherein the computer program instructions further comprise instructions for:
provisioning the client such that the site code is not configured; and
setting the client to request automatic assignment of the site code.

15. The computing device of claim 11, wherein the computer program instructions further comprise instructions for:
detecting that the client is being introduced to the network;
responsive to the detecting, evaluating a persistent flag to identify whether the client should perform the operations of determining and requesting;
responsive to an indication that the persistent flag is enabled, performing the operations of determining and requesting; and
responsive to an indication that the persistent flag is disabled, not performing the operations of determining and requesting.

16. A computing device for automatic management authority server assignment, the computing device comprising:
means for determining that a site code for receiving management service(s) including a policy associated with an enterprise network has not been configured for a client;
responsive to the determining, means for requesting a directory service to automatically assign a site code to the client, the site code identifying a sub-region of a network and a management authority server through which the client can obtain management service(s), the client being connected to the sub-region of the network, wherein the site code is automatically determined as a function of the sub-region of the network into which the client has been introduced in an un-configured state;
means to receive the site code from the directory service;
means to communicate a request to the management authority server associated with the site code to provide a management service to the client; and
responsive to the communicating, means to receive the management service including the policy.

17. The computing device of claim 16, wherein the site code is sticky.

18. The computing device of claim 16, wherein the network comprises multiple sub-regions, and wherein the instructions for determining and requesting are performed responsive to introducing the client to a sub-region of the multiple sub-regions.

19. The computing device of claim 16, wherein the computing device further comprises:
means for provisioning the client such that the site code is not configured; and
means for setting the client to request automatic assignment of the site code.

20. The computing device of claim 16, wherein the computing device further comprises:
means for detecting that the client is being introduced to the network;
responsive to the detecting, means for evaluating a persistent flag to identify whether the client should perform the operations of determining and requesting;
responsive to an indication that the persistent flag is enabled, means for performing the operations of determining and requesting; and responsive to an indication that the persistent flag is disabled, means for not performing the operations of determining and requesting.

21. A method implemented by a computing device for automatic management authority server assignment, the method comprising:

receiving, by a directory service, a request for a site code for receiving management services including a policy associated with an enterprise network from a client, the client being in an un-configured state;

responsive to receiving the request, identifying a site code corresponding to a sub-region location in a network into which the client has been introduced, the sub-region location corresponding to a management authority servers, wherein the site code is automatically determined as a function of the sub-region location of the network into which the client has been introduced in an un-configured state;

communicating the site code to the client, the site code indicating where the client is to obtain network management services;

communicating a request to the management authority server associated with the site code to provide a management service to the client; and responsive to the communicating, receiving the management service including the policy.

22. The method of claim 21, the method further comprising:

receiving an authority request from the client; and responsive to receiving the authority request, identifying one or more management authority servers from which the client is to obtain the network management services; and communicating the information to the client indicating connection criteria for the client to communicate with the one or more management authority servers.

23. The method of claim 21, wherein the connection criteria comprise at least one network address.

24. The method of claim 21, wherein the connection criteria comprise security information.

* * * * *